(12) United States Patent
Sun et al.

(10) Patent No.: US 11,907,073 B2
(45) Date of Patent: Feb. 20, 2024

(54) METHOD AND APPARATUS FOR DATA INTERACTION BETWEEN BIOS AND BMC OF SERVER, AND DEVICE

(71) Applicant: INSPUR SUZHOU INTELLIGENT TECHNOLOGY CO., LTD., Jiangsu (CN)

(72) Inventors: Xiuqiang Sun, Shandong (CN); Jiaming Huang, Shandong (CN); Xuntang Li, Shandong (CN); Yingliang Qiao, Shandong (CN); Huatang Ban, Shandong (CN); Daotong Li, Shandong (CN); Shanbin Al, Shandong (CN); Fanyi Yao, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/034,057

(22) PCT Filed: Sep. 28, 2021

(86) PCT No.: PCT/CN2021/121222
§ 371 (c)(1),
(2) Date: Apr. 26, 2023

(87) PCT Pub. No.: WO2022/100307
PCT Pub. Date: May 19, 2022

(65) Prior Publication Data
US 2023/0393944 A1 Dec. 7, 2023

(30) Foreign Application Priority Data

Nov. 11, 2020 (CN) .......................... 202011254073.5

(51) Int. Cl.
*G06F 11/00* (2006.01)
*G06F 11/14* (2006.01)
*G06F 11/07* (2006.01)

(52) U.S. Cl.
CPC .......... *G06F 11/142* (2013.01); *G06F 11/076* (2013.01); *G06F 11/1417* (2013.01)

(58) Field of Classification Search
CPC .. G06F 11/142; G06F 11/1417; G06F 11/076; G06F 11/0754; G06F 9/4401
See application file for complete search history.

(56) References Cited

U.S. PATENT DOCUMENTS 11,226,919 B1 * 1/2022 Austin ................ G06F 9/4401
2013/0132700 A1   5/2013 Liu et al.
(Continued)

FOREIGN PATENT DOCUMENTS

CN   104615506 A   5/2015
CN   106201799 A   12/2016
(Continued)

*Primary Examiner* — Marc Duncan
(74) *Attorney, Agent, or Firm* — IPro, PLLC (57) ABSTRACT

A method and an apparatus for data interaction between a BIOS and a BMC of a server, a device and a readable storage medium. According to the state of an IPMI link between a BIOS and a BMC, it is determined whether to perform data interaction. At the same time, whether the BMC cannot be activated due to abnormalities are determined by confirming whether the number of times of restarting the server reaches preset threshold at the BDS stage of the BIOS. When the number of times of restarting the server reaches the preset threshold and the BMC is still not activated, the BMC is determined to be abnormal. When the number of times of restarting the server has not yet reached preset threshold, the BIOS performs the action of restarting system, wherein (Continued)

--- after the motherboard of the server of any architecture is powered on, the BIOS firstly starts to check whether the link between the BIOS and the BMC is normal via the IPMI protocol. If normal, the BIOS interacts and transmits data with the BMC via the IPMI protocol, and normally boots to the system

↓ when the link is abnormal, the BIOS does not transmit data through the IPMI protocol at this time, and then the BIOS is performed initializing and starting the device. When the BIOS is started to the BDS stage of the BIOS, the BIOS checks whether the link between the BIOS and the BMC communication is normal via the IPMI protocol. If normal, the BIOS interacts and transmits data with the BMC via the IPMI protocol, and normally boots to the system

↓ when the link is still abnormal, it is determined whether the number of times of restarting reaches the preset threshold. If not, the BIOS executes the restarting command of the system, waits for the time for activating the BMC, and continues to execute the first step and the second step

↓ when the number of times restarting reaches the preset threshold, that the BMC is still not activated or the BMC is damaged causes that the IPMI link cannot be used, the BIOS recovers the information that needs to be obtained from the BMC via the NVRAM variable inside the BIOS, and the BIOS outputs the alarm information that the BMC is not activated or damaged via the serial port at the same time preset threshold is confirmed by a variable self-defined inside the BIOS and may be set freely.

20 Claims, 3 Drawing Sheets

(56) References Cited

U.S. PATENT DOCUMENTS

| | | | |
|---|---|---|---|
| 2016/0147626 A1* | 5/2016 | Hass | G06F 9/4416 714/36 |
| 2017/0109235 A1* | 4/2017 | Hung | G06F 11/1451 |
| 2019/0073285 A1* | 3/2019 | Hayashida | G06F 11/0757 |
| 2019/0220340 A1* | 7/2019 | Chou | G06F 11/0709 |
| 2020/0364125 A1* | 11/2020 | Lee | G06F 11/27 |

FOREIGN PATENT DOCUMENTS

| | | |
|---|---|---|
| CN | 106681878 A | 5/2017 |
| CN | 106933710 A | 7/2017 |
| CN | 109240851 A | 1/2019 |
| CN | 110908847 A | 3/2020 |
| CN | 112463222 A | 3/2021 |

* cited by examiner

METHOD AND APPARATUS FOR DATA INTERACTION BETWEEN BIOS AND BMC OF SERVER, AND DEVICE

CROSS-REFERENCE TO RELATED APPLICATION

The present disclosure claims the priority of the Chinese patent application filed on Nov. 11, 2020 before the China National Intellectual Property Administration with the application number of 202011254073.5 and the title of "METHOD AND APPARATUS FOR DATA INTERACTION BETWEEN BIOS AND BMC OF SERVER, and DEVICE", which is incorporated herein in its entirety by reference.

FIELD

The present disclosure relates to the technical field of computer and, more particularly, to a method and an apparatus for data interaction between a BIOS and a BMC of a server, a device and a readable storage medium.

BACKGROUND

With the rapid development of the chip industry and the internet industry, internet companies in domestic area and abroad have begun to pay more and more attention to the construction of data centers. At the same time, the requirement of purchasing and batch deploying of servers is increasingly. No matter MIPS architecture, Power architecture, ARM architecture, or traditional X86 architecture, the requirement of the servers including different types such as Intel and AMD and other types is also increasing. The server products of all kinds of architectures necessarily use two types of management software including a basic input output system (BIOS) and a baseboard management controller (BMC).

The BIOS is mainly responsible for initializing the hardware device of the server and guiding the operating system. The BMC is mainly responsible for temperature monitoring, energy consumption management and asset information display of components of the server. The action of initializing the server can only be taken charge by the firmware of the BIOS and the firmware of the BIOS may obtain valid data in time, but the BIOS cannot display the hardware information of the server. The BMC may log in and check the basic hardware device information of the server at any time via remote management, but the asset information is sent to the BMC for display via the BIOS. At the same time, some functions of the BIOS also require data interaction with the BMC.

Generally, the BIOS and the BMC perform data interaction via the intelligent platform management interface (IPMI) protocol physical link (which is short for IPMI link hereafter). If the IPMI link between the BIOS and BMC is abnormal, or the BMC is abnormal, the BIOS cannot normally perform data interaction with the BMC. As a result, basic hardware device information of the server cannot be viewed, and even some functions of BIOS are affected.

SUMMARY

An object of the present disclosure is to provide a method and an apparatus for data interaction between BIOS and BMC of a server, a device and a readable storage medium, which is for solving the problem that the BIOS and the BMC cannot perform data interaction due to the IPMI link state abnormality or the BMC abnormality. The solution is as follows:

In a first aspect, the present disclosure provides a method for data interaction between a BIOS and a BMC of a server, applied to the BIOS, including:

S1, when the server is powered on, obtaining a state of an IPMI link between the BIOS and the BMC to obtain a first state value; when the first state value is normal, entering S2; and when the first state value is abnormal, entering S3;

S2, performing data interaction with the BMC via the IPMI link and booting to a system;

S3, initializing the server and booting to a BDS stage, and obtaining the state of the IPMI link between the BIOS and the BMC again to obtain a second state value; when the second state value is normal, entering S2; and when the second state value is abnormal, entering S4;

S4, determining whether a number of times of restarting the server exceeds a preset threshold; when the number of times of restarting the server exceeds the preset threshold, entering S5; and when the number of times of restarting the server does not exceed the preset threshold, entering S6;

S5, determining that the BMC is abnormal, performing self-recovery according to target data in a local preset memory address space, and booting to the system; and S6, executing a restarting command to control the server to restart and entering S1.

In some embodiments, after determining that the BMC is abnormal, the method further includes:

outputting the BMC abnormal prompt information via a serial port.

In some embodiments, executing the restarting command to control the server to restart and entering S1 includes:

executing the restarting command to control the server to restart, waiting for a preset time and entering S1.

In some embodiments, performing data interaction with the BMC via the IPMI link including:

sending hardware device information to the BMC via the IPMI link to display the hardware device information.

In some embodiments, performing data interaction with the BMC via the IPMI link including:

obtaining latest configuration information of a target function from the BMC via the IPMI link.

In some embodiments, performing self-recovery according to the target data in the local preset memory address space including:

reading NVRAM data from the local preset memory address space to obtain original configuration information of the target function.

In a second aspect, the present disclosure provides an apparatus for data interaction between a BIOS and a BMC of a server, applied to the BIOS, including:

a first state obtaining module configured for, when the server is powered on, obtaining a state of an IPMI link between the BIOS and the BMC to obtain a first state value; when the first state value is normal, entering a booting module; and when the first state value is abnormal, entering a second state obtaining module;

the booting module configured for performing data interaction with the BMC via the IPMI link and booting to a system;

the second state obtaining module configured for initializing the server and booting to a BDS stage, and obtaining the state of the IPMI link between the BIOS and the BMC again to obtain a second state value; when the second state value is normal, entering the booting module; and when the second state value is abnormal, entering a restarting-determining module;

the restarting-determining module configured for determining whether a number of times of restarting the server exceeds a preset threshold; when the number of times of restarting the server exceeds the preset threshold, entering an abnormality processing module; and when the number of times of restarting the server does not exceed the preset threshold, entering a restarting module;

the abnormality processing module configured for determining that the BMC is abnormal, performing self-recovery according to target data in a local preset memory address space, and booting to the system; and the restarting module configured for executing a restarting command to control the server to restart and entering the first state obtaining module.

In some embodiments, the abnormality processing module is further configured for:

Outputting the BMC abnormal prompt information via a serial port.

In a third aspect, the present disclosure provides a device for data interaction between a BIOS and a BMC of a server, including:

a memory configured for storing a computer program; and a processor configured for executing the computer program to implement the method for the data interaction between the BIOS and the BMC of the server stated above.

In a fourth aspect, the present disclosure provides a readable storage medium storing a computer program thereon, wherein the computer program, when executed by a processor, implements the method for the data interaction between the BIOS and the BMC of the server stated above.

A method for data interaction between a BIOS and a BMC of a server is provided in the present disclosure, applied to the BIOS, including: when the server is powered on, a state of an IPMI link between the BIOS and the BMC is acquired to obtain a first state value; when the first state value is normal, data interaction is performed with the BMC via the IPMI link and a system is booted to; and when the first state value is abnormal, a device is initialized and a BDS stage is booted to, and the state of the IPMI link between the BIOS and the BMC is acquired again to obtain a second state value; when the second state value is normal, data interaction is performed with the BMC via the IPMI link and a system is booted to; when the second state value is abnormal, whether a number of times of restarting the server exceeds a preset threshold is determined; when the number of times of restarting the server exceeds the preset threshold, it is determined that the BMC is abnormal, self-recovery is performed according to target data in a local preset memory address space, and booted to the system. When the number of times of restarting the server does not exceed the preset threshold, a restarting command is executed to control the server to restart and repeat the steps stated above.

It may be seen that, in this way, whether data interaction is performed is determined according to the state of the IPMI link between the BIOS and the BMC. At the same time, in the method, whether the BMC cannot be activated due to abnormalities are determined by confirming whether the number of times of restarting the server reaches the preset threshold at a boot device select (BDS) stage of the BIOS. When the number of times of restarting the server reaches the preset threshold and the BMC is still not activated, the BMC is determined to be abnormal. When the number of times of restarting the server has not yet reached the preset threshold, the BIOS performs the action of restarting system, wherein the preset threshold is confirmed by a variable self-defined inside the BIOS and may be set freely. By this way, safe and effective data interaction between the BIOS and the BMC of the server may be achieved, the problem of data interaction failure caused by abnormal IPMI link is avoided, and the abnormal state of the BMC may be discovered in time, the safety and reliability of the server are improved, and the invention apply to server products of all architectures.

In addition, the present disclosure further provides an apparatus for data interaction between a BIOS and a BMC of a server, a device and a readable storage medium, whose technical effects correspond to the technical effect of method stated above, which is not repeated here.

BRIEF DESCRIPTION OF THE DRAWINGS

In order to more clearly explain the technical solution in the embodiment or the existing technology of the present disclosure, the following will briefly introduce the drawings that need to be used in the embodiment or the existing technology description. Obviously, the drawings in the following description are only the embodiment of the present disclosure. For a person skilled in the art, other drawings may be obtained according to the provided drawings without paying creative labor.

DETAILED DESCRIPTION

A core of the present disclosure is to provide a method and an apparatus for data interaction between a BIOS and a BMC of a server, a device and a readable storage medium, by this way, safe and effective data interaction between the BIOS and the BMC of the server may be ensured, the problem of data interaction failure caused by abnormal IPMI link is avoided, the abnormal state of the BMC is discovered in time, the safety and reliability of the server are improved.

In order to make a person skilled in the art better understand the solution of the present application, the following is a further detailed description of the present application in combination with the drawing and the embodiments. Obviously, the described embodiments are only a part of the embodiments of the present application, not all of the embodiments. Based on the embodiments of the present application, all other embodiments obtained by a person skilled in the art without making creative labor belong to the scope of protection in the present application.

Figure 1:
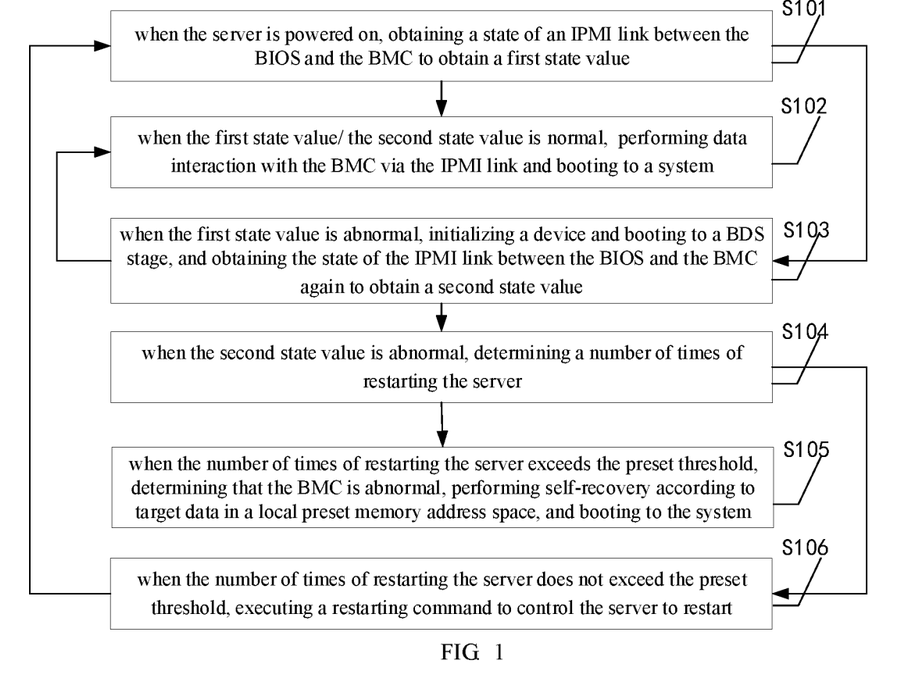
FIG. 1 is a flow chart of some embodiments of the method for data interaction between a BIOS and a BMC of a server provided in the present disclosure.

Some embodiments of the method for data interaction between the BIOS and the BMC of the server provided in the present disclosure is introduced below, referring to FIG. 1, some embodiments are applied to the BIOS, including:

S101, when the server is powered on, obtaining a state of an IPMI link between the BIOS and the BMC to obtain a first state value; when the first state value is normal, entering S102; and when the first state value is abnormal, entering S103.

In the server, the BIOS is mainly responsible for initializing of the hardware device of the server and guiding the operating system. The BMC is mainly responsible for temperature monitoring, energy consumption management and asset information display of components of the server. During initializing the server, the BIOS may obtain the hardware device information of the server, but the BIOS cannot display the hardware device information of the server. The BMC may log in and check the hardware device information of the server at any time via remote management, and the hardware device information is sent to the BMC for display by the BIOS via the IPMI link, thus during initializing the server, the data interaction process between the BIOS and the BMC is essential. In addition, some functions of the BIOS also require data interaction with the BMC, such as performing booting item setting, performing watchdog time setting, vlan and other functions via IPMI command.

In order to avoid that data interaction between the BIOS and the BMC cannot be performed due to IPMI link state abnormality, the embodiments of the present disclosure provide a general solution for safe and effective data interaction between the BIOS and the BMC of the server.

Firstly, when the server is powered on for the first time, the BIOS obtains the state of the IPMI link between the local and the BMC via the IPMI protocol, and determines whether the IPMI link is normal at this time according to the state value fed back by the IPMI protocol. When the state value fed back is normal, S102 is entered, the data that needs to be transmitted between the BIOS and the BMC is interactively set and displayed according to a default transmission mode, and the system is booted to a normal state. When the state value fed back is abnormal, S103 is entered, all the data interaction content are dropped at this time, and the BIOS continues to initialize other devices to the boot device select (BDS) stage.

S102, performing data interaction with the BMC via the IPMI link and booting to a system.

As mentioned above, the data interaction content between the BIOS and the BMC includes, but is not limited to, the hardware device information transmitted by the BIOS to the BMC, the relevant data of some functions of the BIOS transmitted by the BMC to the BIOS, such as the configuration data of functions. Therefore, S102 includes: sending hardware device information to the BMC via the IPMI link to display the hardware device information; obtaining the latest configuration information of the target function from the BMC via the IPMI link.

S103, initializing the server and booting to a BDS stage, and obtaining the state of the IPMI link between the BIOS and the BMC again to obtain a second state value; when the second state value is normal, entering S102; and when the second state value is abnormal, entering S104.

At the BDS stage of the BIOS, whether the IPMI link between the BIOS and the BMC is normal is checked again. When the state value is normal at this time, S102 is entered, and the data that needs to be transmitted between the BIOS and the BMC is interactively set and displayed according to the default transmission mode, and the system is normally booted to. When the state value at this time is abnormal, all the data interaction content is dropped at this time and S104 is entered.

S104, determining whether a number of times of restarting the server exceeds a preset threshold; when the number of times of restarting the server exceeds the preset threshold, entering S105; and when the number of times of restarting the server does not exceed the preset threshold, entering S106;

In general, there may be the following reasons for the IPMI link abnormality: the IPMI link between the BIOS and the BMC is not normally initialized when the server is started, or the physical link is damaged, or the IPMI protocol is not normally initialized, or the BMC is abnormal. The BMC abnormality includes: the BMC is not normally initialized, or BMC is damaged.

In some embodiments, when the state of the IPMI link at the BDS stage is still abnormal, it is determined whether the number of times of restarting the server or the BIOS reaches the preset threshold. When the number of times of restarting the server or the BIOS reaches the preset threshold, it is considered that other possible reasons resulting in the IPMI link abnormality are excluded, and the BMC abnormality is determined and S105 is entered. When the number of times of restarting the server or the BIOS does not reach the preset threshold, S106 is entered, the server is made to restart via that the BIOS executes the system restarting command, and then S101 is returned to, the above steps are repeated.

It is worth mentioning that, the time from the motherboard of the BMC is powered on to activated, or from the motherboard of the BMC is powered-off and restarted to activated, is 60 seconds by default, however the starting time of the BIOS is 40 seconds. Therefore, after performing restarting, the BIOS may wait for a period of time until the BMC is already at an activating state, and then enter S101. It should be understood that, the waiting time here is not less than 20 seconds.

S105, determining that the BMC is abnormal, performing self-recovery according to target data in a local preset memory address space, and booting to the system; and As mentioned above, some functions of the BIOS also need to have data interaction with the BMC. When the BMC is determined to be abnormal, the BIOS cannot obtain data related to these functions from the BMC, which affects the boot process to be smoothly performed. In order to avoid the situation, in the present embodiment, the BIOS performs self-recovery via the data stored in the preset memory address space (i.e., NVRAM variable) to obtain the original data of these functions, and no longer obtains the latest data of these functions from the BMC. Therefore, it may continue to boot to the system without the limitation of transferring parameters of the BMC.

In addition, the state information that is damaged or inactivated of the BMC may be printed via the serial port of the BIOS.

S106, executing a restarting command to control the server to restart and entering S101.

According to the method for data interaction between the BIOS and the BMC of the server provided in the present disclosure, it is determined whether data interaction is performed according to the state of the IPMI link between the BIOS and the BMC. The link state is confirmed for one time when the server is powered on. When the link state is normal, data interaction between the BIOS and the BMC is performed. When the link state is abnormal, the BIOS abandons the data interaction and continues to boot to the BDS stage and confirms the link state again. When the link state confirmed again is normal, data interaction between the BIOS and the BMC is performed. When the link state confirmed again is abnormal, it is determined whether the number of times of restarting the server reaches the preset threshold. When the number of times of restarting the server does not reach the preset threshold, the restarting action is performed, and then the above actions are repeated in turn. When the number of times of restarting the server reaches the preset threshold, it is determined that the BMC is abnormal. The BIOS performs self-recovery according to the target data in the preset memory address space and boots to the system.

The technical solutions provided in the embodiments have strong reproducibility and expansibility. The IPMI protocol of the interaction protocol of the BIOS and the BMC are used to confirm the link state, and then the BIOS confirms the subsequent executing action according to the state value returned by the IPMI protocol, which greatly improves the reliability and safety of the server. Besides, it is also capable to satisfy the time limit requirements for activating the BMC by the time consumed in restarting the system, which provides reliability for the batch deployment and application of data center server. The technical solutions provided in embodiments are not limited by the server chip architecture, and is suitable for server products with different architectures, which is consistent with the future development trend of the technology of the server.

Figure 2:
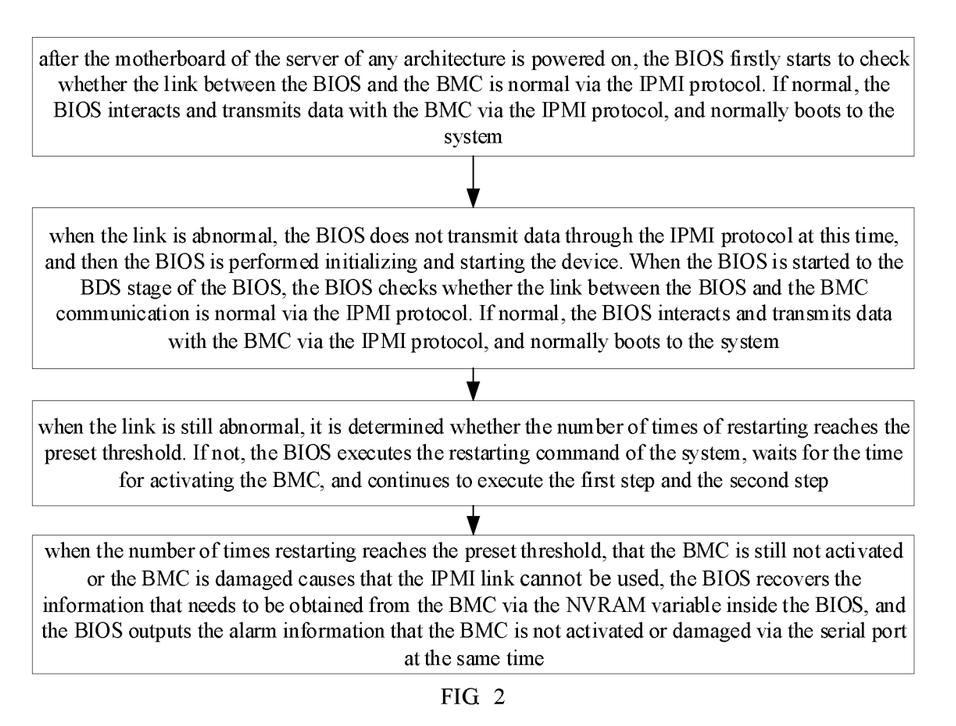
FIG. 2 is a flow chart of some embodiments of the method for data interaction between the BIOS and the BMC of the server provided in the present disclosure.

Some embodiments of the method for data interaction between the BIOS and the BMC of the server provided in the present disclosure is introduced in detail below, referring to FIG. 2, some embodiments include:

In the first step, after the motherboard of the server of any architecture is powered on, the BIOS firstly starts to check whether the link between the BIOS and the BMC is normal via the IPMI protocol. When the link between the BIOS link and the BMC is normal, the BIOS interacts and transmits data with the BMC via the IPMI protocol, and normally boots to the system.

In the second step, when the link between the BIOS link and the BMC is abnormal, the BIOS does not transmit data via the IPMI protocol at this time, and then the BIOS is performed initializing and starting the device. When the device is started to the BDS stage of the BIOS, the BIOS checks whether the link between the BIOS and the BMC communication is normal via the IPMI protocol. When the link between the BIOS and the BMC is normal, the BIOS interacts and transmits data with the BMC via the IPMI protocol, and normally boots to the system.

In the third step, when the link between the BIOS and the BMC is still abnormal, it is determined whether the number of times of restarting reaches the preset threshold. When the number of times of restarting does not reach the preset threshold, the BIOS executes the restarting command of the system, waits for the time for activating the BMC, and continues to execute the first step and the second step.

In the fourth step, when the number of times of restarting reaches the preset threshold, that the BMC is still not activated or the BMC is damaged causes that the IPMI link cannot be used, the BIOS recovers the information that needs to be obtained from the BMC via the NVRAM variable inside the BIOS, and the BIOS outputs the alarm information that the BMC is not activated or damaged via the serial port at the same time.

The apparatus for data interaction between a BIOS and a BMC of a server provided in the embodiments of the present disclosure is introduced below, the apparatus for data interaction between the BIOS and the BMC of the server described below may correspondingly be referred to the method for data interaction between the BIOS and the BMC of the server stated above.

Figure 3:
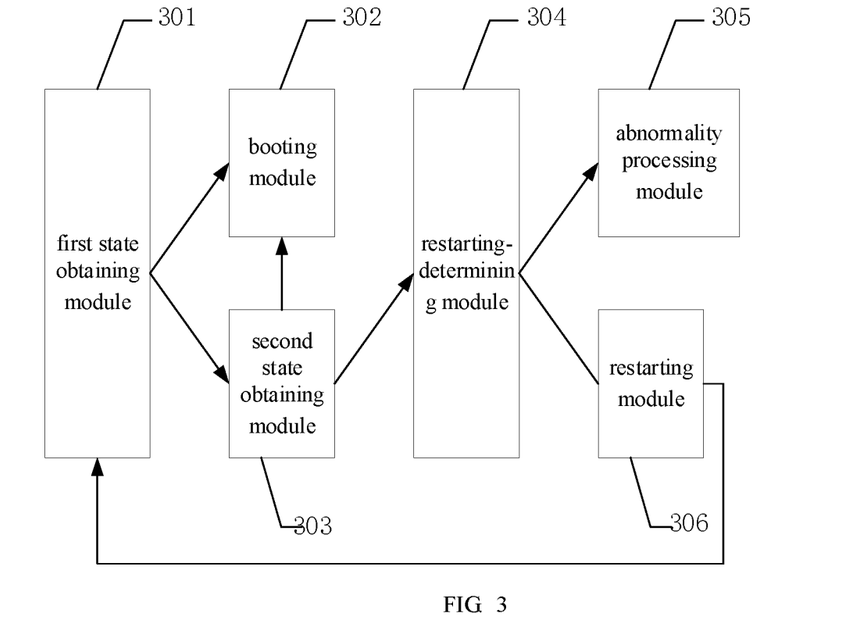
FIG. 3 is a function block diagram of embodiments of the apparatus for data interaction between the BIOS and the BMC of the server provided in the present disclosure.

Referring to FIG. 3, an apparatus for data interaction between a BIOS and a BMC of a server according to the present embodiment, applied to the BIOS, including:

a first state obtaining module 301 configured for, when the server is powered on, obtaining a state of an IPMI link between the BIOS and the BMC to obtain a first state value; when the first state value is normal, entering a booting module 302; and when the first state value is abnormal, entering a second state obtaining module 303;

the booting module 302 configured for performing data interaction with the BMC via the IPMI link and booting to a system;

the second state obtaining module 303 configured for initializing the server and booting to a BDS stage, and obtaining the state of the IPMI link between the BIOS and the BMC again to obtain a second state value; when the second state value is normal, entering the booting module 302; and when the second state value is abnormal, entering a restarting-determining module 304;

the restarting-determining module 304 configured for determining whether a number of times of restarting the server exceeds a preset threshold; when the number of times of restarting the server exceeds the preset threshold, entering an abnormality processing module 305; and when the number of times of restarting the server does not exceed the preset threshold, entering a restarting module 306;

the abnormality processing module 305 configured for determining that the BMC is abnormal, performing self-recovery according to target data in a local preset memory address space, and booting to the system; and the restarting module 306 configured for executing a restarting command to control the server to restart and entering the first state obtaining module 301.

In some embodiments, the abnormality processing module is further configured for:

outputting the BMC abnormal prompt information via a serial port.

The apparatus for data interaction between the BIOS and the BMC of the server provided in the embodiment is configured for implement the method for data interaction between the BIOS and the BMC of the server. Therefore, the embodiments of the apparatus may be referred to the content of the embodiments of the method for data interaction between the BIOS and the BMC of the server stated above, for example, the first state obtaining module 301, the booting module 302, the second state obtaining module 303, the restarting-determining module 304, the abnormality processing module 305 and the restarting module 306, which are used to implement the steps of S101, S102, S103, S104, S105 and S106 of the method for data interaction between the BIOS and the BMC of the server stated above. Therefore, the embodiments of the apparatus may be referred to the description of the corresponding embodiments, and will not be introduced here.

In addition, because the apparatus for data interaction between the BIOS and the BMC of the server provided in the embodiment is configured for implementing the method for data interaction between the BIOS and the BMC of the server, therefore its function corresponds to the function of the method stated above, which is not repeated here.

Figure 4:
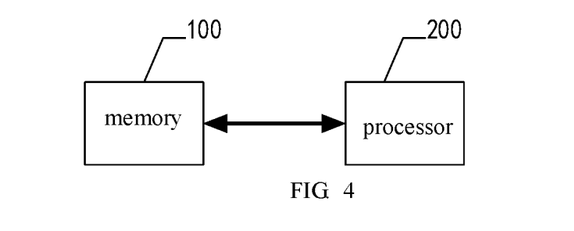
FIG. 4 is a schematic structural diagram of embodiments of the device for data interaction between the BIOS and the BMC of the server provided in the present disclosure.

In addition, the present disclosure provides a device for data interaction between a BIOS and a BMC of a server, referring to FIG. 4, including:

a memory 100 configured for storing a computer program; and a processor 200 configured for executing the computer program to implement the method for the data interaction between the BIOS and the BMC of the server stated above.

Finally, the present disclosure provides a readable storage medium storing a computer program thereon, wherein the computer program, when executed by a processor, implements the method for the data interaction between the BIOS and the BMC of the server stated above.

Each embodiment in the specification is described in a progressive way. Each embodiment focuses on the differences from other embodiments. The same and similar parts between each embodiment may be seen in each other. For the device disclosed in the embodiment, because it corresponds to the method of open embodiment, the description is relatively simple, and the relevant places may be seen in the method section.

The steps of the method or algorithm described in combination with the embodiment described in the specification may be directly implemented by hardware, software modules executed by the processor, or a combination of the two. Software modules may be placed in random access memory (RAM), memory, read-only memory (ROM), electrically programmable ROM, electrically erasable programmable ROM, register, hard disk, removable disk, CD-ROM, or any other form of storage medium known in the art.

The above solution provided by the present application is introduced in detail. In this paper, embodiments are used to explain the principle and implementation of the present application. The above embodiment is only used to help understand the method of this application and its core ideas. At the same time, for the general technical personnel in the art, according to the idea of the present, there will be changes in the implementation and scope of application. In a word, the content of the specification should not be understood as a limitation of the present application.

The invention claimed is:

1. A method for data interaction between a BIOS and a BMC of a server, applied to the BIOS, comprising:
    S1, when the server is powered on, obtaining a state of an IPMI link between the BIOS and the BMC to obtain a first state value; when the first state value is normal, entering S2; and when the first state value is abnormal, entering S3;
    S2, performing data interaction with the BMC via the IPMI link and booting to a system;
    S3, initializing the server and booting to a BDS stage, and obtaining the state of the IPMI link between the BIOS and the BMC again to obtain a second state value; when the second state value is normal, entering S2; and when the second state value is abnormal, entering S4;
    S4, determining whether a number of times of restarting the server exceeds a preset threshold; when the number of times of restarting the server exceeds the preset threshold, entering S5; and when the number of times of restarting the server does not exceed the preset threshold, entering S6;
    S5, determining that the BMC is abnormal, performing self-recovery according to target data in a local preset memory address space, and booting to the system; and
    S6, executing a restarting command to control the server to restart and entering S1.

2. The method according to claim 1, wherein after determining that the BMC is abnormal, the method further comprises:
    outputting BMC abnormal prompt information via a serial port.

3. The method according to claim 1, wherein executing the restarting command to control the server to restart and entering S1 comprises:
    executing the restarting command to control the server to restart, waiting for a preset time and entering S1.

4. The method according to claim 1, wherein performing data interaction with the BMC via the IPMI link comprising:
    sending hardware device information to the BMC via the IPMI link to display the hardware device information.

5. The method according to claim 1, wherein performing data interaction with the BMC via the IPMI link comprising:
    obtaining latest configuration information of a target function from the BMC via the IPMI link.

6. The method according to claim 5, wherein performing self-recovery according to the target data in the local preset memory address space comprising:
    reading NVRAM data from the local preset memory address space to obtain original configuration information of the target function.

7. The method according to claim 1, wherein when the server is powered on for a first time, the BIOS obtains the state of the IPMI link between the server and the BMC via an IPMI protocol.

8. The method according to claim 1, wherein a content of data interaction comprises: hardware device information transmitted by the BIOS to the BMC and data of functions of the BIOS transmitted by the BMC to the BIOS.

9. The method according to claim 8, wherein when the BMC is determined to be abnormal, the BIOS is not capable of obtaining the data of the functions of the BIOS from the BMC.

10. A device for data interaction between a BIOS and a BMC of a server, comprising:
    a memory configured for storing a computer program; and
    a processor configured for executing the computer program to implement the method for the data interaction between the BIOS and the BMC of the server according to claim 1.

11. The device according to claim 10, wherein after determining that the BMC is abnormal, the method further comprises:
    outputting BMC abnormal prompt information via a serial port.

12. The device according to claim 10, wherein executing the restarting command to control the server to restart and entering S1 comprises:
    executing the restarting command to control the server to restart, waiting for a preset time and entering S1.

13. The device according to claim 10, wherein performing data interaction with the BMC via the IPMI link comprising:
    sending hardware device information to the BMC via the IPMI link to display the hardware device information.

14. The device according to claim 10, wherein performing data interaction with the BMC via the IPMI link comprising:
    obtaining latest configuration information of a target function from the BMC via the IPMI link.

15. The device according to claim 14, wherein performing self-recovery according to the target data in the local preset memory address space comprising:
    reading NVRAM data from the local preset memory address space to obtain original configuration information of the target function.

16. A non-transitory readable storage medium storing a computer program thereon, wherein the computer program, when executed by a processor, implements the method for the data interaction between the BIOS and the BMC of the server according to claim 1.

17. The non-transitory readable storage medium according to claim 10, wherein after determining that the BMC is abnormal, the method further comprises:
   outputting BMC abnormal prompt information via a serial port.

18. The non-transitory readable storage medium according to claim 16, wherein executing the restarting command to control the server to restart and entering S1 comprises:
   executing the restarting command to control the server to restart, waiting for a preset time and entering S1.

19. The non-transitory readable storage medium according to claim 16, wherein performing data interaction with the BMC via the IPMI link comprising:
   sending hardware device information to the BMC via the IPMI link to display the hardware device information.

20. The non-transitory readable storage medium according to claim 16, wherein performing data interaction with the BMC via the IPMI link comprising:
   obtaining latest configuration information of a target function from the BMC via the IPMI link.

* * * * *